United States Patent [19]

Kemp

[11] Patent Number: 4,889,668
[45] Date of Patent: Dec. 26, 1989

[54] FIXED-VOLUME, TRAPPED RUBBER MOLDING METHOD

[75] Inventor: Daniel N. Kemp, Midland, Mich.

[73] Assignee: Dow Corning Corporation, Midland, Mich.

[21] Appl. No.: 259,059

[22] Filed: Oct. 17, 1988

Related U.S. Application Data

[62] Division of Ser. No. 105,108, Oct. 5, 1987, Pat. No. 4,812,115.

[51] Int. Cl.$^4$ .................. B29C 43/10; B29C 43/58
[52] U.S. Cl. .................................. 264/40.5; 264/40.6; 264/257; 264/313
[58] Field of Search ............... 425/384, 405.1, 405.2, 425/407, DIG. 44, DIG. 124; 264/313, 317, 258, 257, 40.5, 40.6

[56] References Cited

U.S. PATENT DOCUMENTS

| | | | |
|---|---|---|---|
| 2,909,417 | 10/1959 | Osenberg | 425/128 |
| 3,843,601 | 10/1974 | Bruner | 528/24 |
| 3,985,491 | 10/1976 | King | 425/384 |
| 3,989,790 | 11/1976 | Bruner et al. | 264/225 |
| 4,011,929 | 3/1977 | Jeram et al. | 188/268 |
| 4,167,430 | 9/1979 | Arachi | 156/212 |
| 4,249,882 | 2/1981 | Koch | 425/547 |
| 4,264,556 | 4/1981 | Kumar et al. | 264/314 |
| 4,388,263 | 6/1983 | Prunty | 264/257 |
| 4,409,048 | 10/1983 | Hatch et al. | 156/155 |
| 4,499,048 | 2/1985 | Hanejko | 419/49 |
| 4,547,337 | 10/1985 | Rozmus | 419/49 |
| 4,624,820 | 11/1986 | Barraclough | 264/512 |
| 4,640,711 | 4/1987 | Lichti et al. | 75/248 |
| 4,755,341 | 7/1988 | Reavely | 264/102 |
| 4,755,343 | 7/1988 | Kromrey | 264/102 |
| 4,770,835 | 9/1988 | Kromrey | 264/102 |

FOREIGN PATENT DOCUMENTS

| | | |
|---|---|---|
| 644242 | 3/1967 | Belgium . |
| 0151416 | 8/1985 | European Pat. Off. . |
| 0233134 | 8/1987 | European Pat. Off. . |
| 2134168 | 1/1973 | Fed. Rep. of Germany . |
| 2160467 | 12/1985 | United Kingdom . |

OTHER PUBLICATIONS

Beck, Earl W., *Plastics World*, 6/16/75, "Silicone Rubber Puts on Squeeze For High Quality Composite Layups".
Dreger, Donald R., *Machine Design*, 5/21/81, "Healing Defects by Hip".
Franson, Paul R., SME Fabricating Composites Conference '87.
Hanes, Hugh D., *Tooling & Production*, 12/82, "Isostatic Pressing: Stating the Art".
"Silicone Moldmaking Materials from Dow Corning", (c) 1987.
"Tips for Successful Moldmaking", (c) 1984.
Toops, Jerry, *Machine Design*, 11/22/84, "High Pressure Forming".

*Primary Examiner*—Jay H. Woo
*Assistant Examiner*—Jeremiah F. Durkin, II
*Attorney, Agent, or Firm*—Price, Heneveld, Cooper, DeWitt & Litton

[57] ABSTRACT

A trapped rubber molding method including a die positioned within a fixed-volume, rigid mold, the die being surrounded by an integral solid silicone rubber material which has been cured within the mold at an elevated temperature. The die and mold closure are thermally isolated from the remainder of the mold. The die and the silicone rubber material adjacent thereto are selectively heated and cooled. The opposite end of the mold is selectively heated and cooled. This configuration results in the ability to independently control temperature and pressure on the molded part during the molding process.

24 Claims, 7 Drawing Sheets

FIXED-VOLUME, TRAPPED RUBBER MOLDING METHOD

This is a divisional of copending application Ser. No. 105,108 filed on Oct. 5, 1987 now U.S. Pat. No. 4,812,115.

BACKGROUND OF THE INVENTION

This invention relates to the art of trapped rubber molding and, more particularly, to fixed-volume trapped rubber molding.

Many modern-day structural components are made from materials such as fiberglass or graphite. Such components, typically, are composed of multiple layers of so-called pre-pregs (combination resin and fiber materials) which have been laid up over a die and thereafter cured under rather precise temperature and pressure conditions. The curing of the pre-preg layup, in most instances, is accomplished in an autoclave and requires the use of a vacuum bag or other type of barrier to prevent the pressurized fluid from penetrating the layers and, thus, ruining the component which is being fabricated.

Autoclaves which are suitable for forming such components, as will be readily appreciated by those skilled in the art, are extremely expensive. The vacuum bags, moreover, have a marked tendency to leak, resulting in a high reject rate. A need has existed for a substantial period of time for a process and apparatus wherein the layups for components of this type can be cured or molded under rather precise temperature and pressure conditions, which do not require the use of vacuum bags or other types of barriers and which reduce the incidence of unacceptable finished components to an acceptable level.

It has been proposed heretofore to utilize trapped rubber molding systems to cure such components. These systems, basically, involve the use of a closed container or mold within which a cured elastomer such as silicone rubber having a high coefficient of thermal expansion is placed. The heating of the part on the die in the container causes the elastomer to expand and, when the apparatus is properly configured, applies a uniform isostatic pressure to the pre-preg layup on the die.

These previously proposed trapped rubber molding systems have been of both the variable and fixed-volume types. The variable volume type is illustrated, for example, in U.S. Pat. No. 4,624,820, issued Nov. 26, 1986, and entitled "Molding of Composite Materials." These systems, in general, utilize an external source of hydraulic pressure-i.e., a piston or plate—to close and pressurize the interior of the container during the initial phases of the molding process. As the elastomer is heated and expands, the pressure exerted by the external source is reduced, effectively increasing the volume of the container to maintain the pressure within desired limits.

The fixed-volume type of trapped rubber molding system is illustrated, for example, in U.S. Pat. No. 4,167,430, issued Sept. 11, 1979, and entitled "Method for Fabricating a Composite Bonded Structure." This type of system, to which the present invention relates, utilizes a fixed-volume, rigid container or mold within which the die, the part to be molded and the elastomer are positioned.

The fixed-volume type of trapped rubber molding system is extremely simple from a mechanical standpoint requiring, in effect, no moving parts. Pressures, however, tend to exceed desired and, sometimes, safe limits. If, for example, the elastomer in the fixed-volume container has been cured at or near room temperature and if, when the mold and layup are assembled, the elastomer substantially fills all voids, pressures, upon application of heat, get totally out of hand. It has been previously proposed, thus, to form the elastomer such that, at the commencement of the molding process, it does not fill the mold. One proposal has been to merely leave a gap or a so-called ullage within the mold such that it does not completely fill and thereafter pressurize the laid-up part until a specified temperature has been reached. A similar prior proposal involves curing of the elastomer within the mold at an elevated temperature, thus achieving similar results. While procedures such as these have resulted in controllable pressures in certain uses, they do not permit independent control of pressure and temperature. Particularly, they do not permit maintaining pressure upon the near-finished component as it is cooled below the curing temperature.

Nor do these procedures permit repeated use of a particular mold. Each time the mold is cycled the elastomer which it contains changes. What was the proper ullage for the first cycle will not be the proper ullage for the second cycle. The same for the second to third, and so on. The result, thus, is that even if a given ullage gives the desired temperature-pressure relationship during the first cycle, it may not do so for repeated cycles thereafter.

One potential solution to these problems, as recognized in the prior art, is to selectively cool a portion of the elastomer within the container remote from the die. Elastomers of the types used in those environments have a relatively low coefficient of thermal conductivity and, assuming a relatively constant coefficient of thermal expansion through a given temperature range, pressures should be controllable by causing one portion of the elastomer within the mold to shrink while that portion adjacent the die expands as the desired temperature at the die interface is reached. This solution has been utilized with some success in so-called "crumb" rubber systems where the elastomer is particulate or pulverized and pumped into and out of a pressurized mold each time a cycle is run. Such systems, however, require the use of a vacuum bag, foil or similar barrier system over the laid-up part to be molded. They also require expensive and complicated pumps, pressure vessels and the like.

No one, to Applicant's knowledge, has heretofore successfully applied this theory to a fixed-volume mold containing an elastomer which is an integral solid—i.e., a noncrumb, de-aired elastomer. No one, specifically, has devised a system and method of using the same wherein a part of the type under consideration can be molded under relatively precise temperature and pressure conditions without the use of a vacuum bag or similar barrier mechanism and wherein the same mold ca be used repeatedly for production of a rather large number of parts with an insignificant number of rejects. It is an object of this invention to provide such a system and method of using the same.

SUMMARY OF THE INVENTION

The method and apparatus of this invention comprise the provision and use of a fixed-volume, rigid container or mold having a die positioned therein, the die having a working surface shaped so as to conform to the part to be molded. Within the container is a cured elastomer which, at least at that area adjacent the die, is an integral solid, and which conforms generally to the interior configuration of the container. The elastomer is spaced from the working surface of the die a distance sufficient to accommodate the part to be molded or cured. The elastomer has a relatively high coefficient of thermal expansion and a relatively low coefficient of thermal conductivity. At least the integral solid portion of the elastomer has a relatively low modulus of elasticity so that it will behave as a fluid under molding conditions.

The die and the cured elastomer surrounding it occupy one zone of the interior of the container or mold. The remaining zone contains additional cured elastomer. Heating and cooling means are provided for selectively heating and cooling the die and the cured elastomer in the first zone. Heating and cooling means are also provided for selectively heating and cooling the cured elastomer within the other zone. The provision of these independent heating and cooling means renders it possible to independently subject the part to be molded to increases and decreases in temperature and pressure.

DESCRIPTION OF THE EXPERIMENTAL AND PREFERRED EMBODIMENTS

Figure 1:
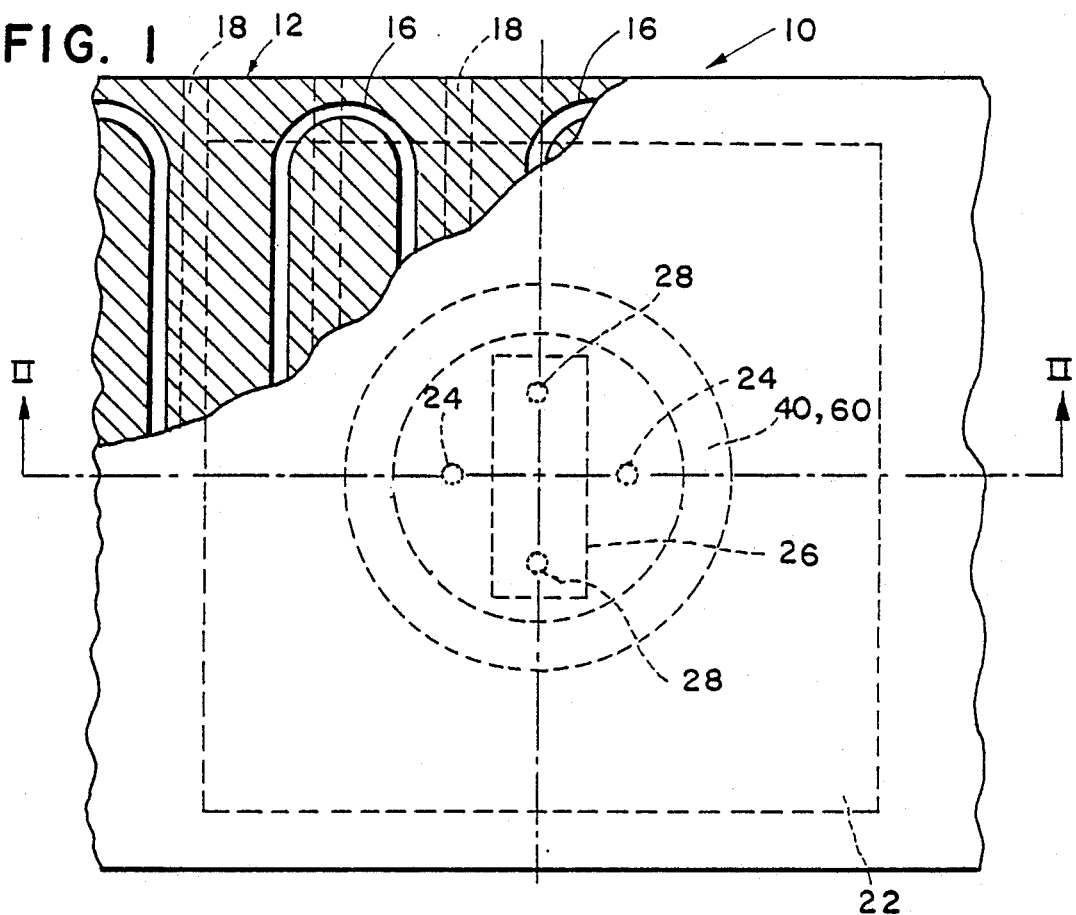
FIG. 1 is a fragmentary, plan view of the molding apparatus.
Figure 2:
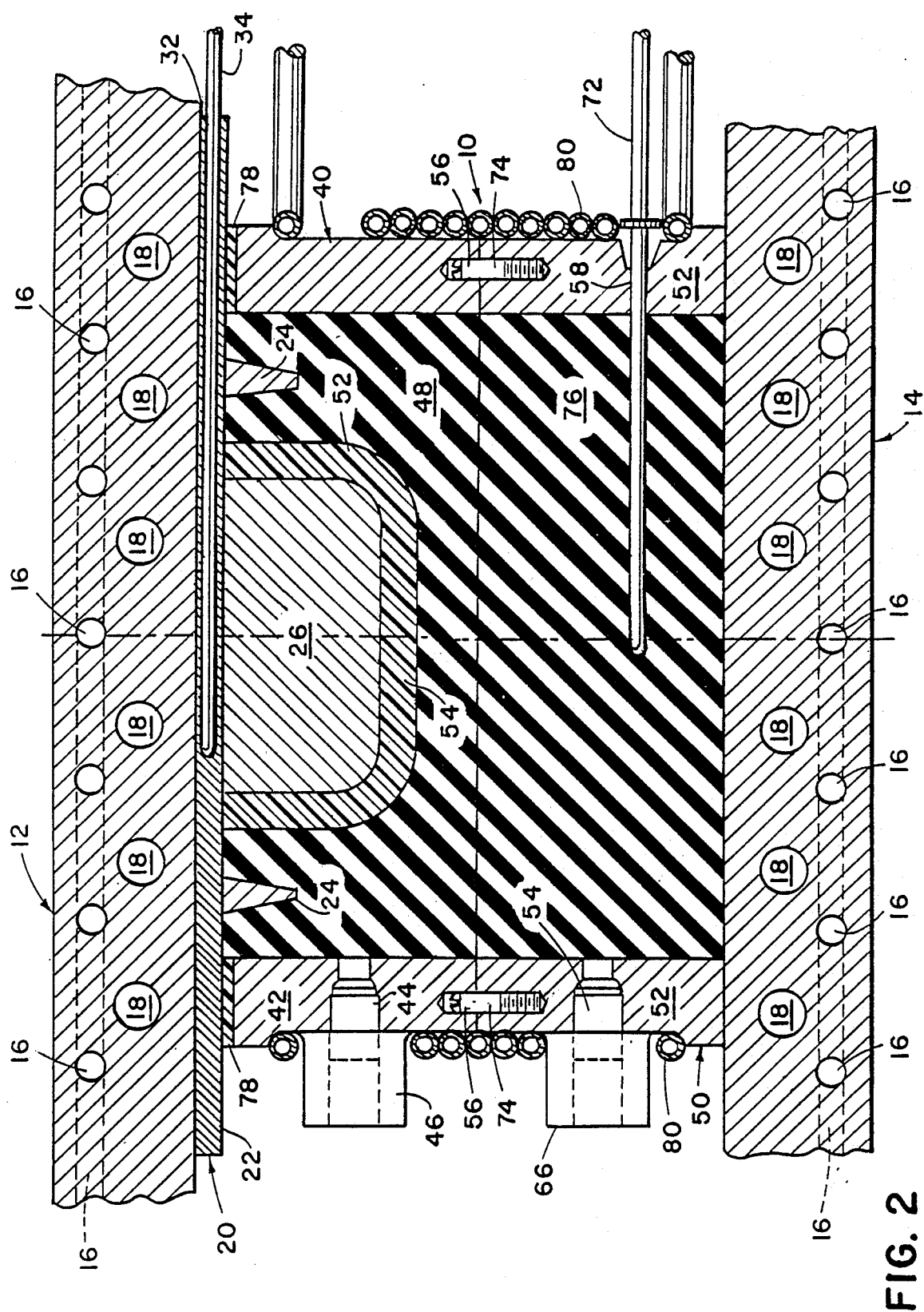
FIG. 2 is a cross-sectional view taken along plane II—II of FIG. 1.
Figure 9:
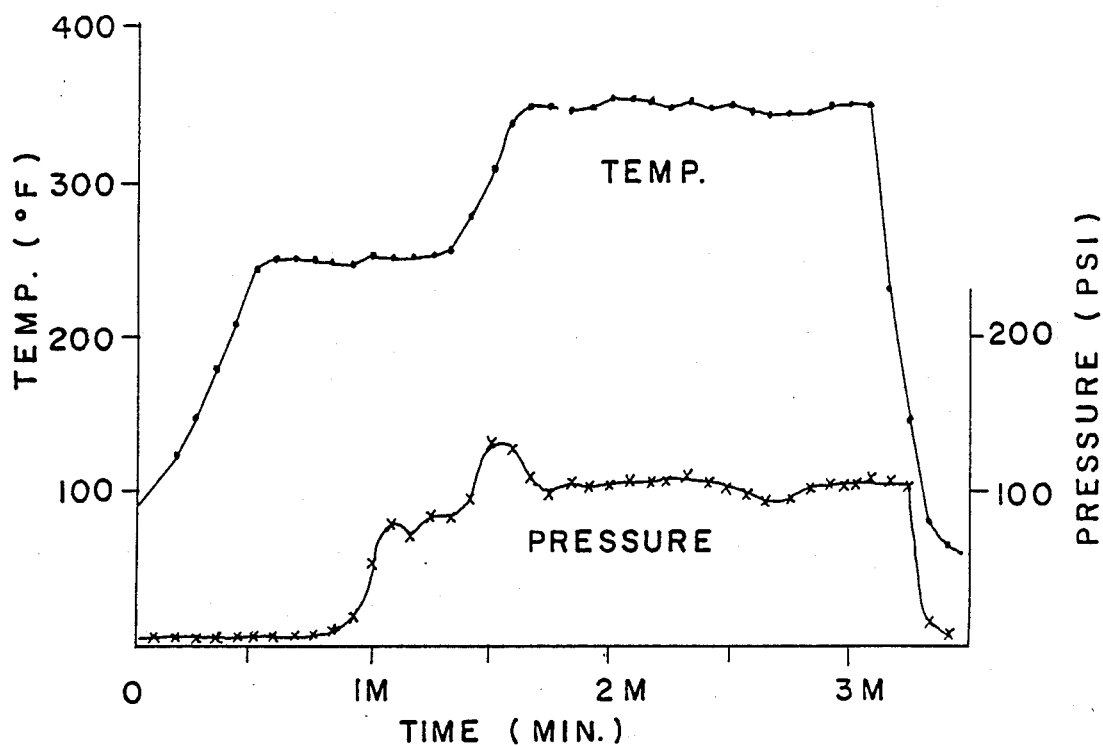
FIG. 9 is a temperature-pressure graph illustrating the pressures and die temperatures measured within the mold under the conditions set forth in Example 4.

FIGS. 1 and 2 illustrate the experimental fixed-volume trapped rubber molding apparatus 10 which is one of the subjects of this invention and which was utilized to cure the pre-preg layups which are the subjects of Examples 2, 3 and 4. This apparatus utilizes the platens on a standard KRAS compression press to form the lower boundary of the container or mold, to retain the die assembly 20 in position and to supply all of the heat and most of the cooling. This method of construction obviated the necessity of building a complete dedicated mold as is illustrated in FIG. 9. It is contemplated, however, that in commercial use dedicated molds such as that illustrated in FIG. 9 will be the norm, and FIG. 9 illustrates the preferred embodiment of this invention.

The upper pres platen 12 and the lower press platen 14 contain coolant passages 16 and electrical resistance heaters 18. The platens, as will be readily appreciated by those skilled in the art, are movable toward and away from one another, ordinarily to apply pressure, heat and/or cooling to a part being fabricated. The platens, in the present case, are utilized solely to sandwich the sidewalls and die assembly of the mold together and do not directly apply pressure to the part being cured.

Underlying upper platen 12 is the die assembly 20 which includes a square plate 22 having tapered locating pins 24 depending therefrom. Affixed to the underside of plate 22 by any suitable fasteners 28 is an aluminum die 26. Die 26, in the illustrated case, takes the form of the interior surfaces of the part to be cured or molded, which is a U-shaped channel. Note, as is pointed out in detail in connection with Example 4, that more uniform parts may be obtained if die 26 is disconnected from plate 22 and permitted to "float" laterally during the molding process.

Plate 22 has a passageway 32 drilled from the peripheral edge to the proximate center thereof. A temperature sensor 34, preferably a thermocouple, is positioned within this passageway such that its temperature sensing area lies in close proximity to die 26.

Die 26, whether floating or not, metallically contacts plate 22 which, in turn, metallically contacts upper platen 12. These contacts insure that good thermal conduction will exist among these parts—i.e., that any induced change in the temperature of platen 12 will be readily reflected at the die 26.

Die zone assembly 40 of the mold was formed from a section of seamless steel pipe 42 turned on its exterior to accommodate the cooling coils described hereinafter. Pipe section 42 was bored to an interior diameter of 7.06 inches, was 2.5 inches in height and had a radial bore 44 through its sidewall to accept and retain pressure sensor 46. Pressure sensor 46 is utilized to sense the pressure in the upper interior of the mold during the curing process.

Within pipe section 42 is positioned a generally cylindrical, cured elastomeric pressurizing member 48 having a trough 52 formed in its upper surface to accommodate the die 26 and pre-preg layup 54. Member 48 also contains mating apertures for tapered locating pins 24 and is formed in the manner to be described hereinafter in connection with FIG. 3.

Control zone assembly 60, similarly, was also formed from a 2.5 inches high section of circular, seamless steel pipe bored to the same internal diameter as section 42. Pipe section 62 also has a bore 64 through the sidewall thereof which accommodates pressure sensor 66. A second bore 68 accommodates temperature sensor 72, the sensitive point of which is positioned near the middle of the pipe section. Pipe section 62 contains a generally cylindrical, cured elastomeric pressurizing member 76 which is formed as described hereinafter in connection with FIG. 4.

Circular pipe sections 42 and 62 are maintained in coaxial relationship by alignment pins 74 which, as illustrated, may be screwed into suitably tapped bores in the lower pipe section 52. Untapped bores 56 in upper section 42 closely accommodate the exposed portions of the pins 74.

Positioned between plate 22 and upper circular pipe section 42 is a heat insulating ring 78, preferably formed from glass-filled polytetrafluoroethylene. The purpose of this insulator is to thermally isolate or insulate, insofar as practical, the sidewalls of the mold 10 from upper platen 12 and die assembly 20. This retards heat transfer between the platens 12 and 14. The sidewalls are wrapped with cooling coils 80 which may be used to further retard heat transfer between platens. These could, as shown, take the form of a continuous wrapping of 0.25-inch copper piping secured firmly to the exterior surfaces of sections 42 and 62.

Figure 3:
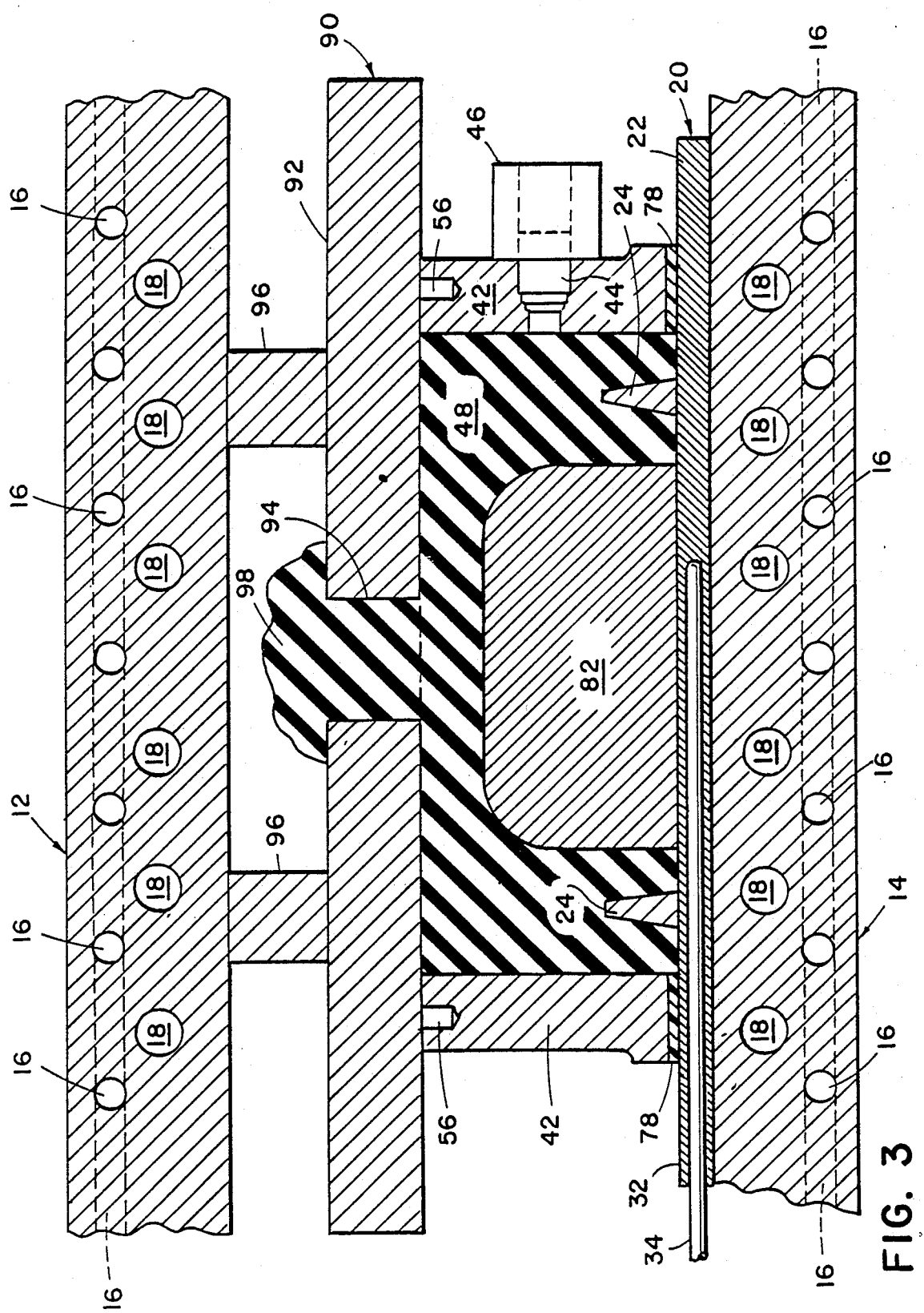
FIG. 3 is a fragmentary, cross-sectional view illustrating the manner in which the elastomer in the die zone is cured in accordance with the preferred embodiment of this invention.

FIG. 3 illustrates the manner in which the pressurizing elastomer is cured within die zone pipe section 42. A curing assembly 90 consisting of a flat plate 92 having an aperture 94 drilled at its center is spaced from upper platen 12 by spacers 96. Die 26 is removed from plate 22 of die assembly 20 and replaced by larger die 82 having a shape conforming to that of the die 26 and the prepreg layup 54 shown in FIG. 2. Die plate 22 is then carefully positioned with respect to pipe section 42.

The elastomer is mixed, de-aired under vacuum and poured to fill the interior of pipe section 42 in the manner illustrated in FIG. 3. The assembly is then placed in the press and the elastomer cured. Heat, if desired, is supplied by the electrical heaters 18 in lower platen 14. If the platen is heated, the elastomer expands during curing and excess material 98 flows through the aperture 94. Once curing has been completed, the plug 98 of excess material is trimmed away flush with the surface of the elastomer as indicated by the dotted line in FIG. 3.

Figure 4:
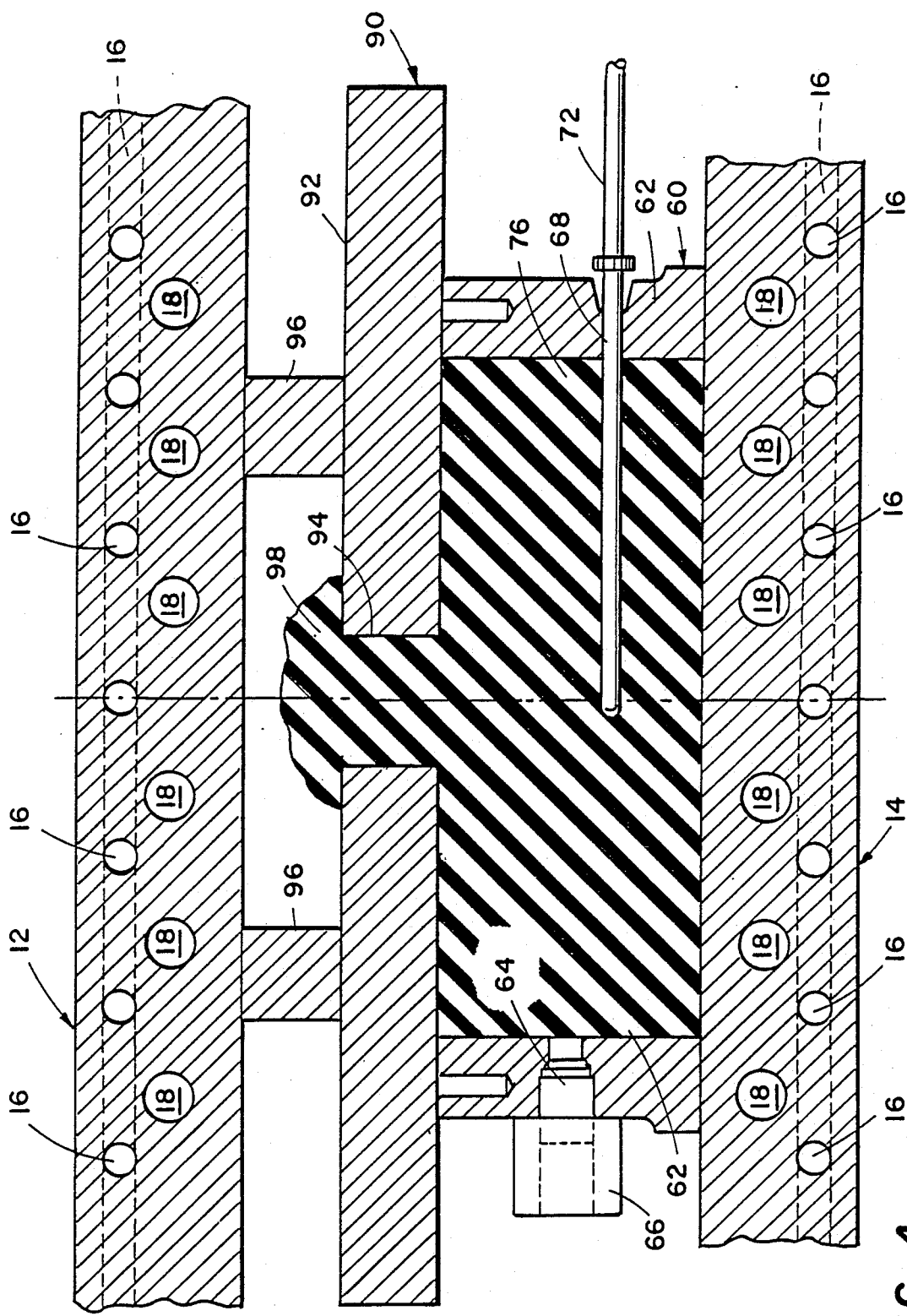
FIG. 4 is a fragmentary, cross-sectional view illustrating the manner in which the elastomer for the control zone is cured in accordance with the preferred embodiment of this invention.

The pressurizing elastomer 76 for the control zone, as illustrated in FIG. 4, is formed in similar fashion. Here, however, pipe section 62 with thermocouple 72 in place is sandwiched between lower press platen 14 and plate 92. The elastomeric material is mixed, de-aired under vacuum and poured to fill pipe section 62. Platen 12 is then brought to bear against spacers 96 in the manner shown, the lower platen heated by heaters 18, if desired, and the material permitted to cure. The plug 98, if any, of excess material which forms during this curing process, again, is cut away flush as indicated by the dotted line in FIG. 4 after curing has been completed.

The temperature at which curing of the elastomeric pressure members 48 and 76 takes place depends to great extent upon the pressure and temperature conditions which the component 54 to be fabricated is to experience during its curing cycle and the utilities which are available to effect cooling of the members during the molding process. If it is possible or financially feasible, for example, to use a liquified gas such as liquid nitrogen to cool the platens and mold exterior, room temperature curing of the pressure members may provide acceptable results. If, on the other hand, it is desired to utilize a more modest utility such as chilled water to effect cooling of the members during the molding process, it will likely be desirable to cure the members at an elevated temperature.

Figure 6:
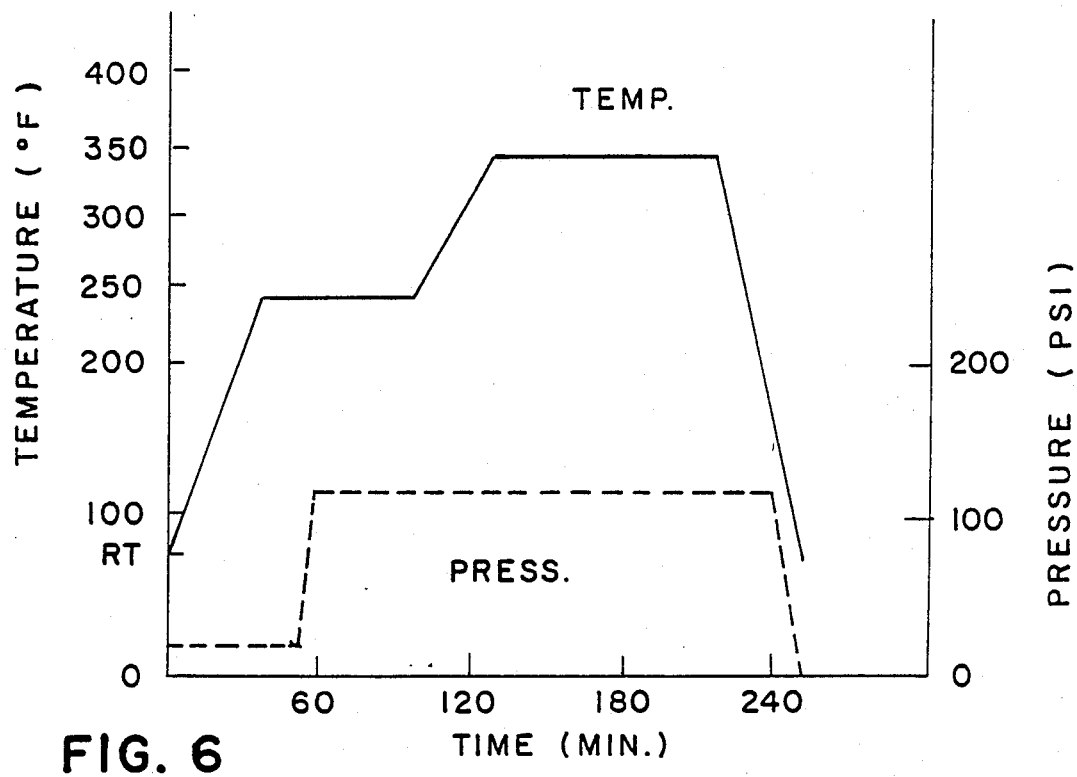
FIG. 6 is a temperature-pressure graph illustrating the manner in which die temperatures and pressures are controlled in an autoclave to produce a satisfactory component.

In Example 2, to follow, a successful attempt was made to emulate the desired pressure-temperature molding sequences of FIG. 6 which were prescribed for the cure of a particular channel in an autoclave using chilled water as the coolant. A maximum temperature of approximately 350° F. was desired. The curing sequence for the die and control zone elastomeric cylinders, 48 and 76, was to place each of the cells into the KRAS press in the configurations illustrated in FIGS. 3 and 4 following pouring of the uncured elastomer thereinto and to heat the lower platen to a temperature of 250° F. The elastomer was allowed to cure at this temperature for one and one-half hours, at which time the platen heat was discontinued. The cells remained in the press overnight. Plate 92 was removed the following morning and the plugs 98 of excess material trimmed away. Trough 52 expanded during cooling and, thus, there was more than ample room for the die and layup when a cycle was initiated. The volume after cure was 94.4% for the upper or die cell and 95.2% for the lower or control cell. This same cure sequence for the pressurizing elastomer was used to fabricate the molds of Examples 1, 3 and 4. The same cylinders 48 and 76, in fact, were utilized in the runs which are the subjects of Examples 2, 3 and 4.

A good guide where chilled water is to be the coolant is to cure the elastomer at a temperature approximately halfway between ambient and the highest temperature which is to be experienced when the trapped rubber molding apparatus is being utilized to cure a layup. Assuming, thus, that a maximum temperature during the anticipated layup molding process was to be 400° F. and an ambient of 70° F., curing of the elastomeric compression member or members should be done at around 235° F.—i.e., $$\frac{400 - 70}{2} + 70 = 235.$$

It is to be emphasized that this is merely a guide and that substantial latitude exists in choosing this curing temperature. It was found, for example, that a curing temperature of 250° F. worked very well where the maximum anticipated mold temperature was to be 350° F. (Example 2). Desired pressures, of course, must also be taken into consideration in determining the elastomeric compression member curing temperature.

Where, as was the case with the mold cycles which are the subjects of Examples 1–4, the elastomeric compression members were cured at 250° F., no appreciable pressure will be experienced within the mold when the average temperature throughout the mold interior is 250° F. At this temperature, rather, the elastomeric compression members will have expanded only to the point where the entire mold is filled. Should it be desired at this point to raise the pressure within the mold while maintaining the temperature at the die constant, lower platen 14 is heated. This added heat, because of the low coefficient of thermal conductivity of the elastomeric member, because of the presence of insulator ring 78 and because of the cooling coils 80, if utilized, will be confined more or less to the control zone, causing the elastomer therein to expand. The compression forces created by this expansion will be transmitted to the layup on the die through the medium of the die zone elastomeric compression member. Should the temperature at the die tend to rise, heat at the upper platen can be reduced.

Should it thereafter be desired to increase the temperature which the layup is experiencing, while maintaining the pressure constant, heat at the upper platen is increased. This increase in heat, of course, causes the elastomeric compression member in the die zone to expand. This expansion is compensated for by reducing the heat to or cooling, if necessary, the elastomeric compression member in the control zone, causing it to contract. The elastomer in the control zone is caused to contract sufficiently to compensate for the expansion of the elastomer in the die zone, holding the pressure which the layup is experiencing constant despite the fact that its temperature has been raised.

Should it thereafter be desired to cool the layup while maintaining the pressure on it at the then-elevated level, it is necessary only to increase the heat on the lower platen 14 while reducing the heat on the upper platen 12. Proper control of these variables will cause the elastomer in the control zone to expand in volume an amount equal to that which the elastomer in the die zone contracts, leaving the pressure at the layup constant.

One cannot, of course, merely draw a line separating the die zone compression elastomer from the control zone compression elastomer. This is true regardless of whether the compression elastomer is the integral product of a single pour or the product of two or more pours, physically separated, as shown in FIGS. 1–4. Assuming however, as can be done for practical purposes, a linear coefficient of thermal expansion through a fairly wide temperature range, an increase of x° F. anywhere within the mold, compensated by a decrease of x° F. of a like volume of elastomer anywhere within the mold, will result in the maintenance of a constant pressure at the layup interface. A decrease in temperature of x° F. anywhere within the mold, compensated by an increase in temperature of x° F./2 in twice the volume of elastomer which the temperature decrease affected, likewise, will result in the maintenance of a constant pressure within the mold. The apparatus and method which are the subject of this invention permit these compensations to be effected while maintaining the layup at the temperature desired at that point in the cycle, and the pressure exerted upon the layup to be varied without affecting its temperature. They also permit temperature at the layup to be varied without affecting the pressure which the layup is experiencing.

The cured elastomer from which trapped rubber molding components 48 and 76 are made should have the following properties:

Integral solid, the term as used in this specification and the appended claims meaning a de-aired—i.e., non-spongelike, nonfoamlike—noncrumb—i.e., nonparticulate—solid, permitting the molding process to be successfully performed without the necessity of a vacuum bag.

A high coefficient of thermal expansion compared to the metal from which the structural walls of the mold are made, permitting desired pressures to be reached in the mold.

A low coefficient of thermal conductivity, permitting quasi thermal isolation between the die zone and the control zone compression elastomers.

A tear strength sufficiently high to permit the completed part to be removed without destruction of the mold—i.e., the more complex the part, the higher the necessary tear strength.

A sufficiently low modulus of elasticity permitting the elastomeric compression member or members to behave as a fluid under pressure so that isostatic molding conditions can be achieved.

Thermal stability at the anticipated molding temperatures—i.e., 250° F. and up—permitting repeated usage of the mold and insuring that the layup will not be adversely affected by decomposing elastomer. The elastomer at the die interface, ideally, should also have inherent release properties, although separate release agents may be utilized.

It is essential, of course, that only those portions of the elastomer immediately surrounding the die exhibit the integral solid, tear strength and modulus of elasticity properties which are the subjects of the foregoing paragraph. It is entirely possible, although not preferred, to use the integral solid elastomer only in the die zone of the mold and to use a low-strength elastomer in the control zone while still enjoying the major advantages of the present invention.

A silicone rubber composition which has a viscosity sufficiently low to allow it to be cured in very deep section without forming voids, preferably the viscosity should be below 200 Pa.s when measured at 25° C., is especially useful. The viscosity of the silicone rubber composition is preferably below 100 Pa.s. Silicone rubber compositions which have such viscosities and which are useful for the present process are those which have 100 parts by weight of triorganosiloxy endblocked polydiorganosiloxane having a viscosity at 25° C. of from 1 to 50 Pa.s in which the organic groups are monovalent hydrocarbon radicals or halogenated monovalent hydrocarbon radicals where there is at least two alkenyl radicals per molecule, preferably having two alkenyl radicals at the terminals; a polyorganohydrogensiloxane having at least three silicon-bonded hydrogen atoms per molecule and being present in an amount sufficient to provide a molar ratio of silicon-bonded hydrogen atoms per silicon-bonded alkenyl radicals in the composition of from greater than 1:1 to 5:1; and a platinum catalyst in an amount sufficient to provide from 1 to 100 parts by weight of platinum per one million parts by weight of composition.

Silicone rubber compositions which are preferred are those which have 100 parts by weight of triorganosiloxy endblocked polydiorganosiloxane having a viscosity at 25° C. of from 1 to 50 Pa.s in which the organic groups are monovalent hydrocarbon radicals or halogenated monovalent hydrocarbon radicals where there is an average of two alkenyl radicals per molecule, preferably at the terminals; 5 to 30 parts by weight of a benzene soluble resin copolymer having triorganosiloxy units and $SiO_2$ units in a molar ratio of from 0.5:1 to 1.2:1 where the triorganosiloxy units are mixtures of trimethylsiloxy units and dimethylvinylsiloxy units wherein the vinyl content of the resin copolymer is in the range of from 0.5 to 3 weight percent based on the weight of the resin copolymer; a polyorganohydrogensiloxane having at least three silicon-bonded hydrogen atoms per molecule and being present in an amount sufficient to provide a molar ratio of silicon-bonded hydrogen atoms per silicon-bonded alkenyl radicals in the composition of from greater than 1:1 to 5:1; and a platinum catalyst in an amount sufficient to provide from 1 to 100 parts by weight of platinum per one million parts by weight of composition. The composition contains the benzene soluble resin copolymer as a reinforcing agent to provide tensile strength and tear strength of sufficient values to make the silicone rubber compositions useful in this method. In addition to the resin copolymer, the composition can also contain reinforcing silica, preferably in amounts up to 50 parts by weight based on 100 parts by weight of triorganosiloxy endblocked polydiorganosiloxane. Reinforcing silicas include the fumed silicas, precipitated silicas, aerogels, xerogels, where the specific surface area of the silica is greater than 100 square meters per gram. The compositions can also contain nonreinforcing fillers such as crushed quartz, diatomaceous earth and various metal oxides. The nonreinforcing fillers can be present in amounts of up to 100 parts by weight based on 100 parts by weight of triorganosiloxy endblocked polydiorganosiloxane. The composition can also contain platinum catalyst retardants or inhibitors which are well known in the art, such as polymethylvinylcylcosiloxanes, acetylenic alcohols and maleates. The retardants or inhibitors are used in amounts to adjust the curing time or to inhibit the cure at room temperatures or at elevated temperatures such as up to 75° C. for a period of time by selecting the kind and amount of retardant or inhibitor used. The compositions can also contain pigments or colorants such as titanium dioxide or chromium oxide.

Examples of the monovalent hydrocarbon radicals include methyl, ethyl, propyl, vinyl, allyl, cyclohexyl, cyclohexenyl, hexenyl and phenyl. Examples of halogenated monovalent hydrocarbon radicals include 3,3,3-trifluoropropyl. The organic radicals are preferably methyl and the alkenyl radical is preferably vinyl.

A silicone rubber found particularly useful in the practice of this invention was made by mixing a base and a curing agent in a weight ratio of 10 weight parts base to 1 weight part curing agent. The base was a mixture of 40.4 parts by weight of a dimethylvinylsiloxy endblocked polydimethylsiloxane having a viscosity at 25° C. of about 2 Pa.s, 21.4 parts by weight of a dimethylvinylsiloxy endblocked polydimethylsiloxane having a viscosity at 25° C. of about 10 Pa.s, 26.9 parts by weight of a fumed silica having trimethylsiloxy surface treatment, 3.2 parts by weight of titanium dioxide powder, 7.9 parts by weight of a benzene soluble resin copolymer of triorganosiloxy units and $SiO_2$ units in a mol ratio of about 0.7:1 where the triorganosiloxy units were trimethylsiloxy units and dimethylvinylsiloxy units present in amounts to provide about 1.8 weight percent vinyl radical in the copolymer, and 0.2 part by weight of a platinum catalyst which was a complex obtained by reacting chloroplatinic acid with divinyltetramentyldisiloxane and then diluting it with dimethylvinylsiloxy endblocked polydimethylsiloxane fluid to obtain a platinum concentration of about 0.7 weight percent. The curing agent was a mixture of 41.7 parts by weight of a dimethylvinylsiloxy endblocked polydimethylsiloxane having a viscosity at 25° C. of about 2 Pa.s, 22.4 parts by weight of benzene soluble resin copolymer as described for the base, 34.6 parts by weight of a trimethylsiloxy endblocked poly(methylhydrogensiloxane-dimethylsiloxane) in which there was about 60 mol percent methylhydrogensiloxane units and the average degree of polymerization was about ten, and 1.3 parts by weight of polymethylvinylcyclosiloxane mixture having mostly four and five siloxane units per molecule.

A rubber made in accordance with this formula was utilized in the molding cycles which are the subject of Examples 1 through 4. That rubber exhibits the following ranges of physical properties after curing based upon a sample thickness of 125 mils, cured 24 hours at 25° C.:

| TEST | PROPERTY | RANGE |
| --- | --- | --- |
| ASTM D-2240 | Durometer, Shore A | = 31–40 |
| ASTM D-412 | Tensile strength at break | = 642–952 psi |
| ASTM D-412 | Elongation at break | = 252–461% |
| ASTM D-624 | Tear strength, Die B | = 80–143 ppi |
| ASTM D-2214 | Thermal Conductivity, Cal-cm/sec-sq cm/°C. | = $4.35 \times 10^{-4}$ |
| * | Volume Coefficient of Thermal Expansion, cc/cc/°c (0–100° C.) | = $7.2 \times 10^{-4}$ |

*See Appendix A.

Another silicone rubber which, although not tested, is believed to be satisfactory in the practice of this invention is made by mixing a base and a curing agent in a weight ratio of 10 weight parts base to 1 weight part curing agent. The base is a mixture of 51.5 parts by weight of dimethylvinylsiloxy endblocked polydimethylsiloxane having a viscosity at 25° C. of about 30 Pa.s, 37.5 parts by weight of 5 micron crushed quartz, 10.9 parts by weight of a benzene soluble resin copolymer of triorganosiloxy units and $SiO_2$ units in a mol ratio of about 0.7:1 where the triorganosiloxy units are trimethylsiloxy units and dimethylvinylsiloxy units are present in amounts to provide about 1.8 weight percent vinyl radical in the resin copolymer, and 0.13 part by weight of a platinum catalyst which is a complex obtained by reacting chloroplatinic acid and divinyltetradisiloxane and diluting with dimethylvinylsiloxy endblocked polydimethylsiloxane fluid to obtain a platinum concentration of about 0.7 weight percent. The curing agent is a mixture of 53 parts by weight of a dimethylvinylsiloxy endblocked polydimethylsiloxane having a viscosity at 25° C. of about 30 Pa.s, 11.2 parts by weight of the benzene soluble resin copolymer described for the base, 29.9 parts by weight of a trimethylsiloxy endblocked poly(methylhydrogensiloxane-dimethylsiloxane) in which there is about 60 mol percent methylhydrogensiloxane units and the degree of polymerization is about ten, 5 parts by weight of chromium oxide, and 0.9 part by weight of polymethylvinylcyclosiloxane mixture having mostly four and five siloxane units per molecule.

A rubber made in accordance with this formula exhibits the following ranges of physical properties after curing based upon a sample thickness of 125 mils, cured 24 hours at 25° C.:

| TEST | PROPERTY | RANGE |
| --- | --- | --- |
| ASTM D-2240 | Durometer, Shore A | = 36–59 |
| ASTM D-412 | 150% modulus | = 313–773 psi |
| ASTM D-624 | Tear strength, Die B | = 46–104.7 ppi |
| ASTM D-2214 | Thermal Conductivity, Cal-cm/sec-sq cm/°C. | = $8.11 \times 10^{-4}$ |
| * | Volume Coefficient of Thermal Expansion, cc/cc/°c (0–100° C.) | = $9.0 \times 10^{-4}$ |

*See Appendix A.

The foregoing specific formulations are intended to be merely exemplary. The specific formulation chosen for any given molding situation will depend on many factors including part constituency and complexity, mold size and configuration, available sources for heating and cooling the mold and the like.

It is not essential, of course, that the mold sidewalls and the elastomeric compression members contained therein be fabricated in sectionalized fashion as illustrated in FIGS. 1–4. While such sectionalized fabrication makes the mold components easier to handle and facilitates curing of the elastomeric compression members, the sidewalls and the bottom of the mold, in actual commercial use, will likely be an integral piece and the elastomeric compression member the product of a single pour as will be discussed in connection with FIG. 9.

EXAMPLE 1

A trapped rubber molding apparatus similar to that illustrated in FIGS. 1 and 2 except that it included no die or pre-preg layup was cycled to determine the validity of the inventor's concept. The object, specifically, was to determine whether pressure and temperature could be independently controlled within the mold. Heating and cooling controls were adjusted manually throughout the run.

The elastomeric compression members were cured at 250° F. The upper member differed from that shown in FIG. 2 in that the space occupied by die 26 and layup 54 was substantially filled with cured elastomer. The material was cured in situ in the manner illustrated and described in connection with FIGS. 3 and 4.

Figure 5:
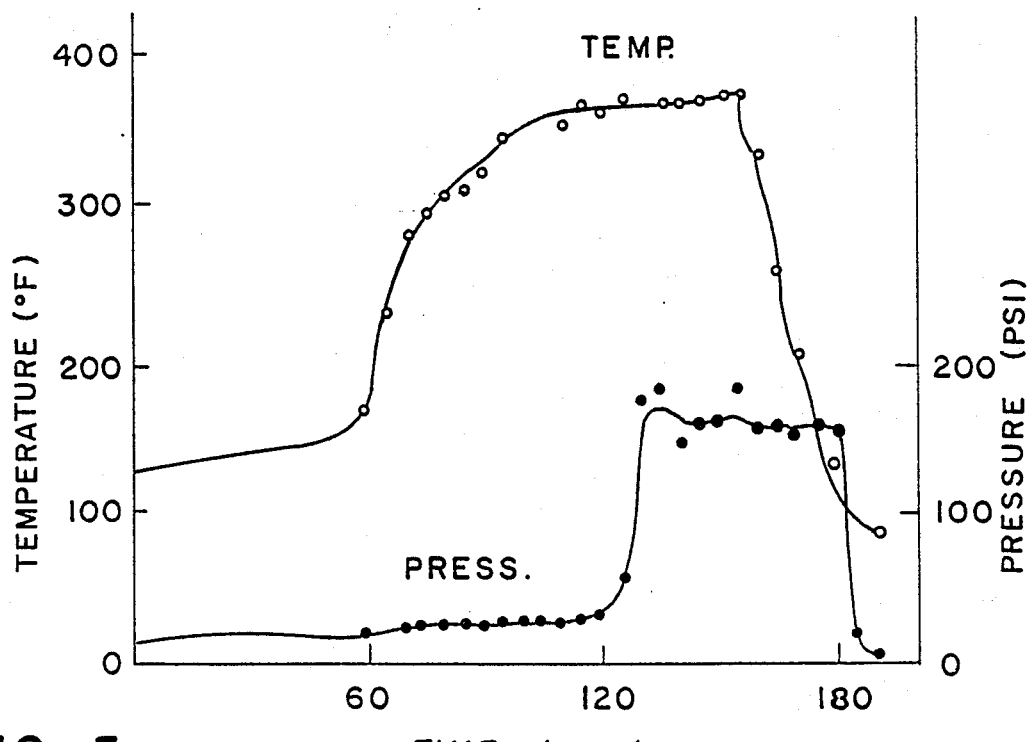
FIG. 5 is a temperature-pressure graph illustrating the pressures and die temperatures measured within the mold under the conditions set forth in Example 1.

Pressure and temperature data was recorded following attainment of a temperature of approximately 125° F. Pressure and temperature data recorded during the run is shown in the graph of FIG. 5. Pressures and temperatures are those that existed in the upper or die section of the mold.

For the first 60 minutes, sufficient heat was applied by the heaters 18 of the upper platen 12 to maintain the temperature in the contemplated die region at approximately the 125°-145° F. range. The pressure at the contemplated die region, during this period, remained atmospheric. At this point, the mold plate 22 surface temperature was caused to rise sharply by applying additional heat to the upper platen. Near atmospheric pressure was maintained within the mold by circulating refrigerated water through coolant passages 16 of lower platen 14 and encircling tubing 80. The temperature was stabilized at about 375° F. approximately 100 minutes into the cycle.

At approximately 120 minutes, heaters 18 in bottom platen 14 were energized, raising the temperature of control elastomer 76. This caused the pressure within the mold to rise sharply to approximately 160 psi. Temperature at the contemplated die location was maintained at approximately 375° F. during the initial phase of this portion of the cycle. Heat at the lower platen was controlled so as to maintain approximately this pressure condition for the succeeding 60 minutes.

At approximately 150 minutes into the cycle, full cooling was applied to the plate 22 by circulating coolant through ducts 16 in upper platen 12. This caused the temperature at the plate to fall off, as illustrated, rather rapidly. During the period in which mold surface temperature was falling, more and more heat was applied to the control elastomer in an attempt to maintain the pressure within the mold at or near 160 psi despite the cooling of the contemplated part location. That attempt, as shown in FIG. 5, was completely successful. The pressure was maintained until the part temperature dropped to approximately 100° F. at which time, about 180 minutes into the cycle, full cooling was applied to the upper and lower platens and the surrounding copper tubing.

The run which is the subject of this Example proved the validity of the inventor's concept. It proved, specifically:

(1) that the part molding surface could be heated to a cure temperature of 375° F. while maintaining low pressure conditions;

(2) that the part surface could be maintained at 375° F. while raising the pressure in the cavity to almost any desired level; and (3) that the pressure can be maintained at the desired elevated level while the part is cooled.

Therefore, pressure and temperature at the contemplated part surface were independently controlled.

EXAMPLE 2

The configuration illustrated in FIGS. 1 and 2 was utilized in the molding cycle which is the subject of this Example. The die zone and control zone elastomeric sections 48 and 76 had been prepared in accordance with the illustrations of FIGS. 3 and 4 and cured at 250° F. A successful attempt was made in the cycle which is the subject of this Example to emulate the pressure-temperature cycle conditions which were recommended in the industry for the curing of a pre-preg layup having a channel or U-shape in an autoclave. This industry pressure-temperature cycle is shown in FIG. 6.

Seven layers of FIBERITE 976 (a graphite-epoxy pre-preg), denoted by the reference numeral 54 in FIG. 2, were placed on the mold surface 26 at 0° orientation. Heat was applied to the upper platen until the part temperature, as indicated by thermocouple 34, reached approximately 250° F. Sufficient heat was maintained on the upper platen to keep the part at this temperature for approximately 60 minutes. At approximately 50 minutes into the cycle, heat was applied to the lower platen. This caused the pressure within the mold to rise from atmospheric to approximately 110 psi. Sufficient heat was maintained upon the bottom platen to sustain this pressure for a period of approximately two and one-half hours.

At approximately 90 minutes into the cycle, the temperature of upper platen 12 was again increased to raise the part temperature to approximately 350° F. It was necessary, at this point, to reduce heat—i.e., cool—the control zone elastomer 76 so that the pressure within the mold would be maintained at approximately the desired 100 psi level. At approximately 270 minutes into the cycle, the part was rapidly cooled by applying coolant to the upper platen 12 through ducts 16. Pressure was maintained at or near 100 psi for approximately 15 minutes of this part-cooling period by raising the temperature of the control zone elastomer 76. At that time, approximately 288 minutes into the cycle, full cooling was applied.

The mold was thereafter disassembled, the part removed and sectioned. It was found to be of good quality and conforming to the desired shape.

Figure 7:
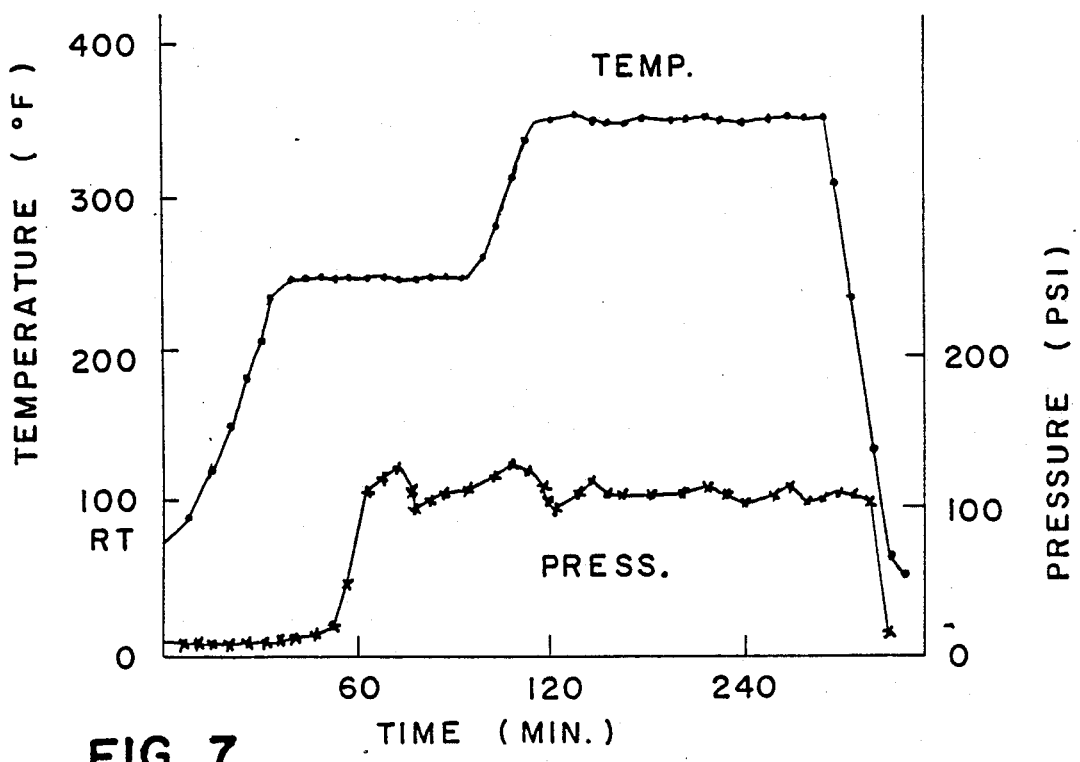
FIG. 7 is a temperature-pressure graph illustrating the pressures and die temperatures measured within the mold under the conditions set forth in Example 2.

A comparison of the graphs of FIGS. 6 and 7 illustrates the rather precise nature with which pressures and temperatures can be controlled in a trapped rubber mold by using the apparatus and method which are the subjects of the present invention. The comparison illustrates, additionally, the ability to emulate the temperature-pressure conditions specified for the autoclaving of such a part with an apparatus costing but a fraction of the price of an autoclave.

EXAMPLE 3

The run which is the subject of this Example was a successful attempt to repeat the temperatures to which the part was subjected in the example of FIG. 2 while maintaining the pressure, during the increased pressure phase of the cycle, at approximately 50 psi. A temperature pressure cycle of this type could be desirable, for example, in the case of a honeycombed part which higher pressures could crush. Elastomeric pressure members 48 and 76, used in the run which is the subject of Example 2, were reused.

Figure 8:
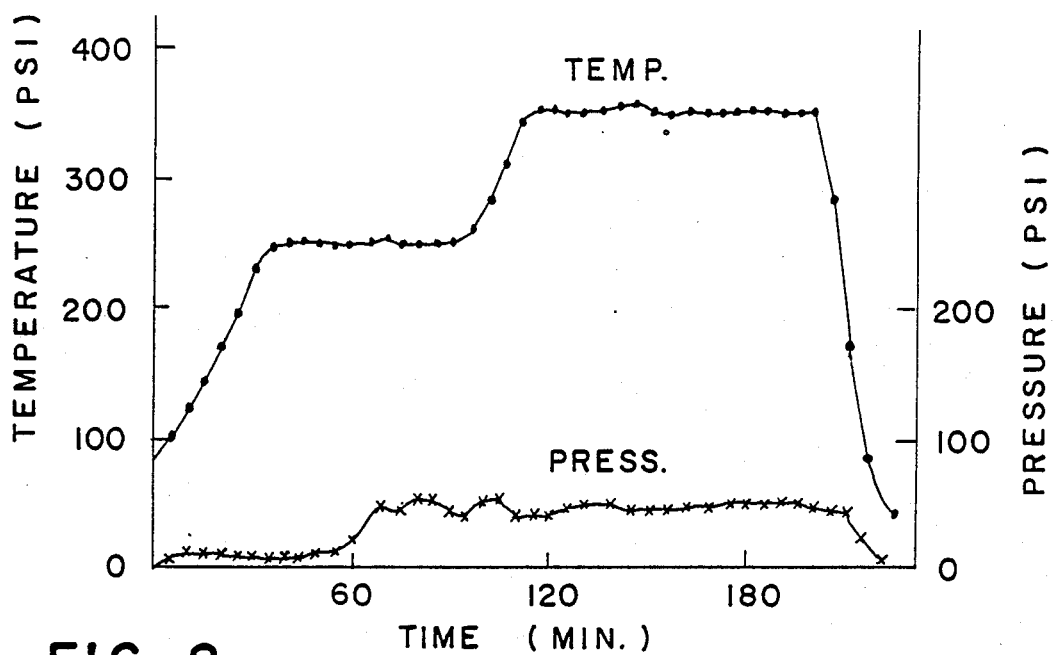
FIG. 8 is a temperature-pressure graph illustrating the pressures and die temperatures measured within the mold under the conditions set forth in Example 3.

The results of this run are illustrated in FIG. 8. It will be noted that the pressure was maintained at or about 50 psi from approximately 72 minutes into the cycle until full cooling was achieved. The temperatures, at the same time, were maintained at or about the levels illustrated in FIGS. 6 and 7. This was done by increasing the cooling on lower platen 14 from that utilized in the run of Example 2. Again, the validity of the inventor's concept was demonstrated.

EXAMPLE 4

The run which is the subject of this Example was similar to the run which is the subject of Example 2 with the major exception that the metal die 26 was unbolted from the plate 22 and allowed to "float" within the trough 52. A tendency had been noted in the previous runs for one sidewall flange of the part to come out slightly thicker than the other. This run constituted an attempt to see if the die 26 and composite layup thereon would self-center within the trough 52 during the molding process. Elastomeric pressure members 48 and 76, used in the runs which are the subject of Examples 2 and 3, were again reused.

The pressure-temperature sequence for this run appears in FIG. 9. These parameters were controlled in the same manner discussed in connection with Example 2, although a somewhat compressed time sequence was followed. The part, upon removal from the mold, was found to have side flange walls equal in thickness (0.085") and a top wall or web thickness of 0.086". The part was well cured and evidenced no resin-rich areas. This run showed that the die would self-center within the trough 52 and that it was advantageous, when molding a part of this configuration, to leave it unrestrained so that it could do so.

Figure 10:
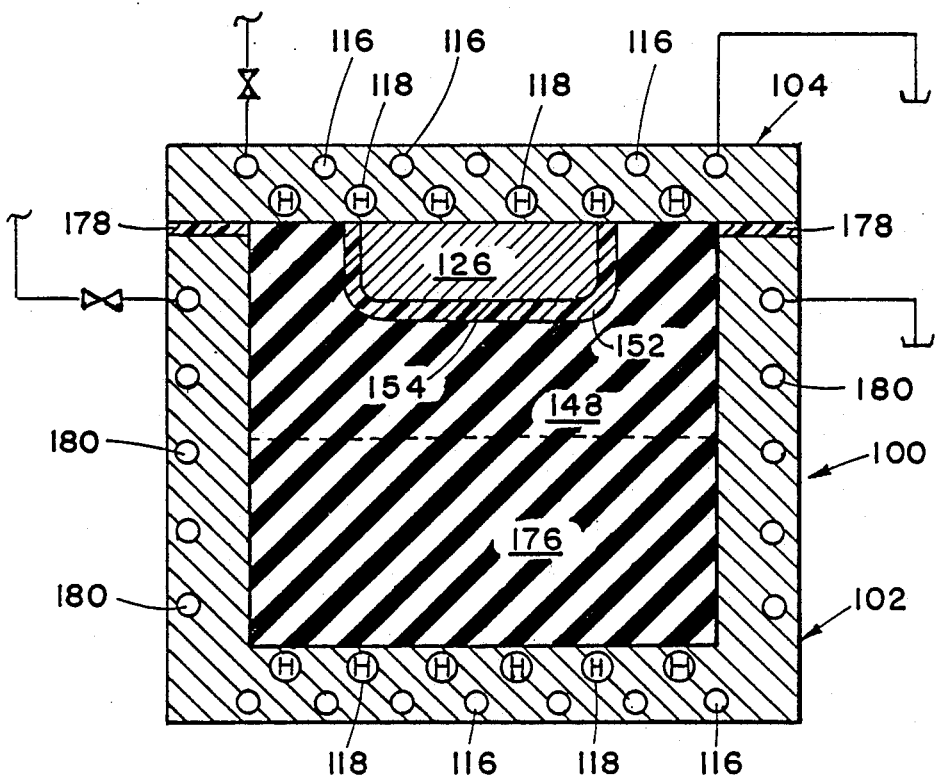
FIG. 10 is a cross-sectional view of a modified, although preferred, embodiment of the invention.

FIG. 10 illustrates the preferred form of fixed-volume trapped rubber molding apparatus 100 which is a dedicated mold. The apparatus, in this embodiment, has integrally formed bottom and sidewalls having cooling passageways 116 and 180 drilled therethrough. Heaters 118 are supplied to heat the control zone 176.

A lid 104, again spaced from mold 102 by an insulating ring of glass-filled polytetrafluoroethylene, is secured in any suitable fashion to the container, taking care to minimize heat conduction between the container and its top. Lid 104 contains cooling passages 116 and heater units 118. The die 126 upon which the pre-preg 154 to form the part is laid up is contiguous but unconnected to lid 104 in heat-conducting fashion.

The elastomer forming control zone 176 and die zone 148, in this case, is the product of a single pour. The pour would be made using a lid having an enlarged die similar to die 82 in FIG. 3 depending therefrom. The lid, of course, would be vented to permit excess material to flow from the mold during the curing of the elastomer.

Cure temperatures are controlled using the heaters 118. The mold would also be equipped with temperature and pressure probes positioned similarly to those shown in FIGS. 1 and 2. The upper temperature probe, in the case of the embodiment illustrated in FIG. 10, would penetrate the sidewall and lie close to the center of the layup 154.

It is unnecessary, in either the embodiment of FIGS. 1 and 2 or the embodiment of FIG. 9, that the mold be hermetically sealed. Using the preferred elastomer at pressures similar to those which were reached in Examples 1–4, thus, the mating surfaces of the mold need not be machined. The mold need not be sealed in the pressure vessel sense.

While a preferred embodiment of the method and apparatus which are the subject of this invention, along with a minor modification, has been illustrated in detail, it will be apparent to those skilled in the art that other embodiments and modifications may be conceived and fabricated without departing from the spirit and scope of this invention. Such other embodiments and modifications are to be deemed included within the scope of the appended claims unless these claims, by their language, expressly state otherwise.

APPENDIX A

EXPANSION—Linear Thermal-Coefficient-Dupont TMA941

Thermal coefficient of expansion ($\Delta l/l$ per °C.) is determined over a specified temperature range between $-100°$ to $500°$ C. by positioning a dilatometer probe upon the solid. The sample and probe is then program heated at a constant temperature rate; this temperature change will cause a dimensional change of the specimen which is sensed by the dilatometer. This movement is amplified and applied to the Y-axis of the recorder with the sample temperature applied to the X-axis. The net result is a trace of probe placement versus temperature.

The linear coefficient of expansion is reported as:
1. A single number if the slope of the expansion curve is a straight line.
2. Two or more numbers with specific temperatures of transition points which take place within the specified temperature range.
3. The first derivative of the function which best fits the expansion curve if it is a smooth curved line.

Apparatus

Micrometer: To read ±0.001 in., any suitable source.

Reference Standards: Aluminum and lead. Dupont Instrument Company, Wilmington, Del.

Thermal Analyzer: Dupont 900 (or 990). Same source as above.

Thermomechanical Analyzer: Dupont 941 (or 942). Same source as above.

Reagent

Nitrogen: Liquid, any suitable source.

Precautions

Safety: Use proper hand protection when using liquid nitrogen and the hot apparatus.

Procedural: No unusual precautions.

Parameters

The temperature range in degrees centigrade must be specified. When the material is non-isotropic the direction of measurement should be specified.

Procedure

Place the sample in the dilatometer sample holder assembly. Adjust the dilatometer probe so the probe seats itself atop the sample. Adjust the sample temperature to at least twenty degrees below the lowest specified temperature before starting the program (Note 1). Adjust the probe tension or place a weight (Note 2) upon the dilatometer probe to ensure placement. Allow the program to run to the maximum temperature. Observe the expansion curve and select the appropriate function to calculate the slope (dY/dT). Note and record any transition temperatures.

Make separate calculations for any portions to the curve separated by transition temperatures.

Report the linear coefficient of expansion (Δl/l per °C.) to three significant figures and any transition temperatures to the nearest degree centigrade.

Standardization

Calibrate the dilatometer probe every 6 months as follows: Measure the height (H) of the standard aluminum cylinder to the nearest 0.001 in. with a micrometer. Place the cylinder in the dilatometer sample holder accessory. Place the probe on the cylinder. Program heat the assembly. Determine the slope $(dY/dT_{Al})$ as outlined in the procedure at a convenient temperature in units of chart paper inches per degree centigrade. Calculate the sensitivity (S).

$$S = \frac{(\alpha_{lTAl})(H)}{(dY/dT_{Al})}$$

S = Sensitivity of instrument for given Y-axis setting in inches of probe deflection per inch of chart paper. This is a linear function of the Y-axis setting and not a constant.

$\alpha T_{Al}$ = Linear coefficient of expansion at temperature T (°C.) of the standard aluminum cylinder. The value is obtained from the instruction manual.

T = The temperature (°C.) at which the slope is determined.

H = The height of the standard aluminum cylinder in inches.

$dY/dT_{Al}$ = Slope in inches of chart paper travel per degree centigrade.

Calculations $\alpha_l T = (1/H)(dY/dT)(S)$ $\alpha_l T$ = Linear coefficient of expansion in (Δl/l per °C.) of the material tested.

H = Height of sample in inches.

dY/dT = Slope in inches of chart paper travel per degree centigrade.

S = Sensitivity of instrument for given Y-axis setting in inches of probe deflection per inch of chart paper. This is a linear function of the Y-axis setting and not a constant.

Precision and Accuracy

The precision of this method is reported in the instruction manual to be within 5%.

Notes

1. The heating rate should not exceed 5° C./min to eliminate any large thermal resistances.
2. Usually a 2-gm weight is used.

References

Instruction manual supplied with the instrument.

Figures, Graphs, and Sketches

None.

The embodiments of the invention in which an exclusive property or privilege is claimed are defined as follows:

1. A method of subjecting a part to be molded to a predetermined sequence of increased temperatures and pressures, said method comprising the steps of: providing a fixed volume, rigid mold with a die positioned therein, said die having a working surface shaped so as to conform to the configuration of the part to be molded; providing a cured elastomer within said mold which, at least in that area adjacent the die, is an integral solid, said elastomer conforming generally to the interior configuration of said mold and being spaced from said working surface a distance sufficient to accommodate the part to be molded, said elastomer having a relatively high coefficient of thermal expansion and a relatively low coefficient of thermal conductivity, at least the integral solid portion of the elastomer having a relatively low modulus of elasticity; shaping the mold such that said die and the cured elastomer surrounding it define one zone of the interior of said mold with a second zone of the interior of said mold containing additional cured elastomer; laying up the part to be molded on said working surface; closing said mold; molding said part, said molding step including the steps of selectively and independently increasing and decreasing the temperature and pressure to which the part is subjected by selectively heating and cooling said die and at least that portion of the elastomer in said one zone surrounding the die, thereby controlling the temperature to which the part is subjected, and by independently selectively heating and cooling at least a portion of the elastomer in said second zone, thereby controlling the pressure to which the part is subjected independently of its temperature.

2. The method as set forth in claim 1 wherein said cured elastomer is an integral solid in its entirety.

3. The method as set forth in claim 1 wherein said cured elastomer is a silicone rubber.

4. The method as set forth in claim 1 wherein the modulus of elasticity of the integral solid portion of said elastomer is sufficiently low that said elastomer will behave as a fluid during at least a portion of the period during which the part to be molded is subjected to said predetermined sequence of temperatures and pressures.

5. The method as set forth in claim 4 wherein the coefficient of thermal conductivity of said elastomer is sufficiently low to quasi thermally isolate said zones, one from the other.

6. The method as set forth in claim 5 wherein said cured elastomer is an integral solid in its entirety.

7. The method as set forth in claim 6 wherein said cured elastomer is a silicone rubber.

8. The method as set forth in claim 1 wherein the volume of cured elastomer within said mold is such that the pressure within said mold will not rise significantly until it has been heated to a temperature in excess of ambient but lower than the highest temperature which the part is to experience during said predetermined sequence of increased temperatures and pressures, said volume being such that the pressure within said mold and the temperature at the part can be controlled in accordance with said predetermined sequence of increased temperatures and pressures during said molding step.

9. The method as set forth in claim 8 which further comprises the step of curing said elastomer within said mold or a substantially identically-shaped container at a temperature between ambient and the highest temperature which the part is to experience during said predetermined sequence of increased temperatures and pressures.

10. The method as set forth in claim 9 wherein said elastomer is an integral solid in its entirety.

11. The method as set forth in claim 10 wherein the modulus of elasticity of said elastomer is sufficiently low that said elastomer will behave as a fluid during at least a portion of the period during which the part to be molded is subjected to said predetermined sequence of temperatures and pressures.

12. The method as set forth in claim 11 wherein the coefficient of thermal conductivity of said elastomer is sufficiently low to quasi thermally isolate said first and second zones.

13. The method as set forth in claim 12 wherein said elastomer is a silicone rubber.

14. The method as set forth in claim 10 wherein said curing step is carried out in said mold and which further comprises the step of enlarging said die during the curing step to dimensions corresponding generally to the die upon which the part is layed up and the layed-up part.

15. The method as set forth in claim 1 which further comprises the step of curing said elastomer within said mold or a substantially identically-shaped container at a temperature in excess of ambient but lower than the highest temperature which the part is to experience during said predetermined sequence of increased temperature and pressure, said curing temperature being such that the pressure within said mold and the temperature at the part can be controlled during said molding step in accordance with said predetermined sequence of increased temperatures and pressures.

16. The method as set forth in claim 15 wherein said curing step is carried out at a temperature approximately halfway between ambient and the highest temperature which the part is to experience during said predetermined sequence of increased temperatures and pressures.

17. The method as set forth in claim 15 wherein said cooling steps comprises the use of a cooling medium other than a liquified gas.

18. The method as set forth in claim 17 wherein said cooling medium is water.

19. The method as set forth in claim 15 which further comprises the steps of providing said mold with a removable metal closure, making said die of metal, positioning said die in direct contact with said closure, and selectively heating and cooling said closure.

20. The method as set forth in claim 19 which further comprises the step of permitting said die to float within said elastomer during the molding process.

21. The method as set forth in claim 19 which further comprises the step of thermally isolating said closure and die from the remainder of said mold.

22. The method as set forth in claim 19 which further comprises the steps of positioning a metallic end wall on the opposite side of said mold from said closure, and selectively heating and cooling said end wall.

23. The method as set forth in claim 22 which further comprises the steps of providing said mold with metallic sidewalls extending from said end wall, said sidewalls terminating in an opening adapted to receive said closure and cooling said sidewalls.

24. The method as set forth in claim 23 which further comprises the step of thermally isolating said closure and die from the remainder of said mold.

* * * * *